United States Patent [19]
Smith, Jr.

[11] 3,709,331
[45] Jan. 9, 1973

[54] CARRIAGE SAFETY SYSTEM

[75] Inventor: Raymond L. Smith, Jr., Southbury, Conn.

[73] Assignee: C & M Manufacturing Company, Inc., Bethesda, Md.

[22] Filed: July 24, 1970

[21] Appl. No.: 57,931

[52] U.S. Cl. ................................... 187/9, 187/20
[51] Int. Cl. ................................... B66b 9/20
[58] Field of Search .................... 189/9, 11, 20

[56] References Cited

UNITED STATES PATENTS

| | | | |
|---|---|---|---|
| 3,284,052 | 11/1966 | Godbersen | 254/148 |
| 3,414,087 | 12/1968 | Schmiesing | 254/148 X |
| 2,169,440 | 8/1939 | Weiss | 187/9 |
| 2,642,157 | 6/1953 | Milz | 107/9 |

*Primary Examiner*—Harvey C. Hornsby
*Assistant Examiner*—Merle F. Maffei
*Attorney*—Littlepage, Quaintance, Wray & Aisenberg

[57] ABSTRACT

Carriage free fall in catching up with a lowered supporting means is prevented by connecting a chain to a carriage, passing the chain under a fixed lower pulley and then over a fixed upper pulley and connecting the chain to the support. In lift trucks, the support is usually a piston with an idler sprocket over which a chain passes to move the carriage at twice the speed of the piston. The safety chain is passed beneath an idler connected to the piston and is fixed near the upper pulley so that the piston is permitted to move only half the distance of the carriage.

2 Claims, 3 Drawing Figures

INVENTOR
RAYMOND L. SMITH JR.

Littlepage, Quaintance, Wray & Aisenberg
ATTORNEYS

INVENTOR
RAYMOND L. SMITH JR.

CARRIAGE SAFETY SYSTEM

Many carriage devices which are supported for upward movement depend upon gravity to insure their downward movement as their supporting device is lowered. The vertically moving carriage of a lift truck is conventionally supported by one or more chains which are connected to the carriage, pass over pulleys or idler sprockets mounted on the distal ends of vertical pistons and which chains are fixed at opposite ends with respect to cylinders so that a carriage moves upward at twice the linear speed of the piston.

Lowering of the carriage is effected by controllably releasing pressure from the cylinder and lowering the piston, whereupon the carriage moves downward at twice the speed of the piston. Thus, the carriage depends upon gravity for its lowering. The control of the speed at which the carriage is lowered is made by the cylinder and piston, which with the chain, or chains, tend to hold the carriage upward.

A very dangerous condition exists when the carriage is held in an elevated position by some means other than the chain and piston. In that condition, when fluid is released from the cylinder with the intention of lowering the carriage, the weight of the chain and piston cause the lowering of the piston, pulley and chain. The carriage remains in the elevated position supported only by that force which erroneously holds it. When the force is removed, nothing controls the rate of descent and the carriage free-falls until it catches up to the chain and piston, or until it encounters such object.

If the carriage is not loaded, and if the distance of free fall is not great, and if the carriage is caught by the chain and piston before encountering an object, no industrial accident may be recorded, and no injury or damage may occur.

If the carriage is heavily loaded, if the free-fall distance is great, or if an object is encountered during the free fall, damage may occur to the load, the surroundings, to the lift truck, and to its mast, cylinder, piston, chain and connections. The lift truck operator, or those in the immediate surroundings, may be injured.

In many types of lift trucks, particularly in order-picking warehouse stacker-retrievers, the operator rides on the carriage. When the carriage is operator-ridden, the dangers of free fall are magnified. Moreover, even small uncontrolled carriage falls, which do no damage to the equipment or operator, are extremely disquieting to the operator.

While the cause of a carriage sticking in an unsupported elevated position is not important to the consideration of the present invention, several causes might be noted. Dirt may accumulate in tracks along which a carriage rolls, causing the carriage to stick. Very small articles falling between the carriage and tracks may cause the temporary stopping of the carriage or the slowing of the carriage below the speed of descent of the piston. A carriage may come into contact with a fixed external object as it is being lowered. When the object moves, the carriage falls. One potential difficulty might exist in a warehousing system in which a truck with an elevated carriage moves in a very narrow aisle. As the carriage was descending, while a truck was moving through the aisle a carriage might come into contact with a fixed item such as a pallet extending slightly outward from a rack. As the carriage moved beyond the extended pallet, it would fall before catching up to the piston and chain which continued descent during the unintentional hold-up of the carriage. Many causes of malfunction might exist.

While the problem solved by the present invention is particularly acute in the lift truck art, the same problem may exist in any form of stacker retriever, such as a crane or in other forms of movable and fixed elevators. Any support device which is capable of lifting a carriage, but which is incapable of producing a positive downward movement of the carriage is susceptible to an accident of a type forseen and overcome by the present invention.

One object of the invention is the provision of carriage control apparatus for preventing downward movement of a carriage supporting device in the absence of corresponding movement of a carriage.

Another object of the invention is the provision of a method for controlling the downward descent of a carriage support according to the downward descent of a carriage.

These and other objects of the invention will be apparent from the disclosure which includes the foregoing and ongoing specification, the claims and the accompanying drawings.

DETAILED DESCRIPTION OF THE DRAWINGS

Figure 1:
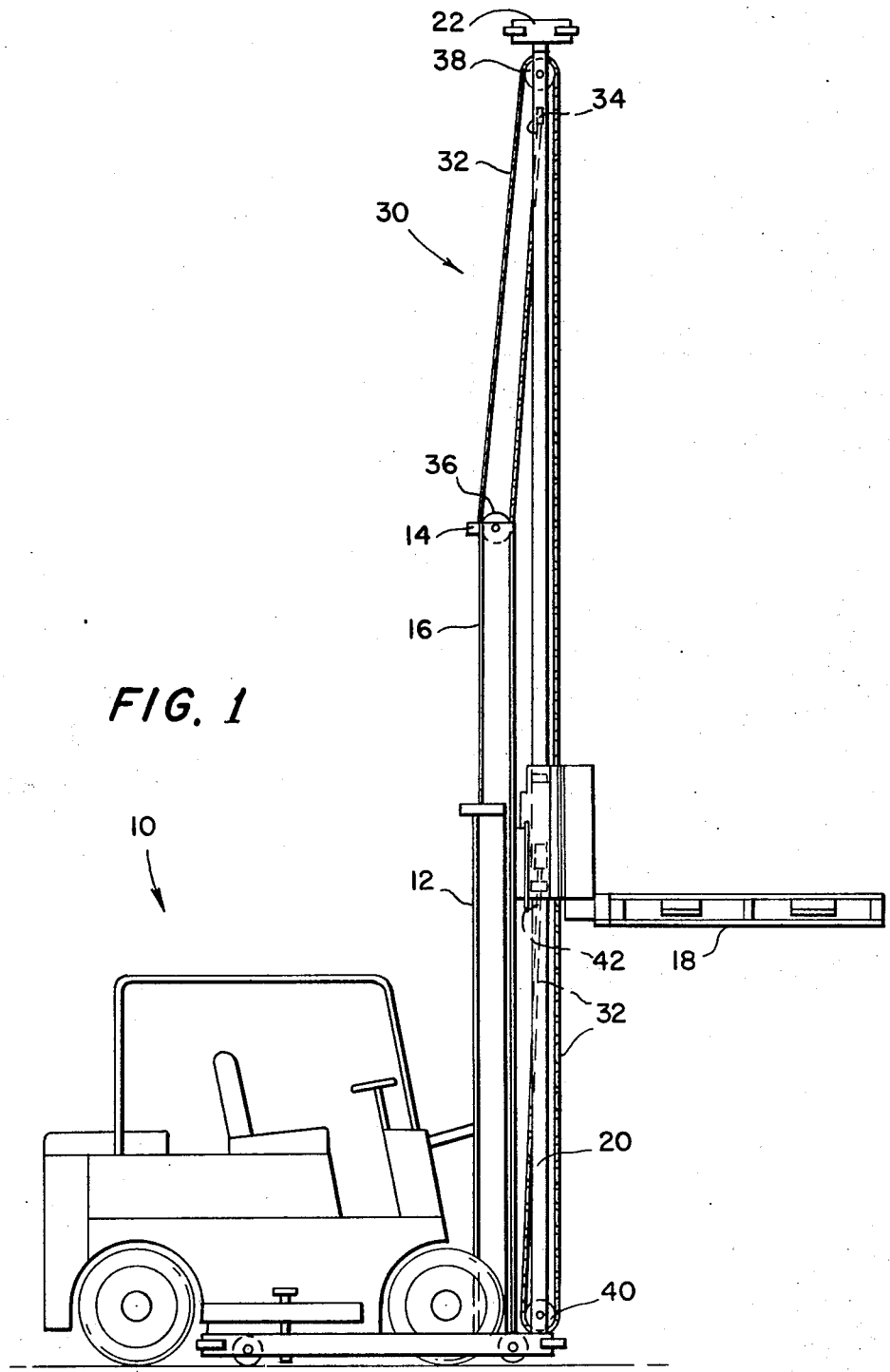
FIG. 1 is an over all view of the invention as used with a lift truck.

In FIG. 1 the numeral 10 generally indicates a lift truck. The lift truck 10 has a conventional telescoping mast 12. The mast is moved upward by a cylinder and piston which is connected to an upper extremity 14 of the inner portion 16 of the mast 12. A chain has one end fixed to mast 12. An intermediate portion of the chain is passed over an idler sprocket mounted near upper mast extremity 14, and a distal end of the chain is connected to vertically movable carriage 18.

In the warehousing stacker configuration shown in FIG. 1, lift truck 10 is provided with a rigid vertical mast 20. Mast 20 is connected at lower extremity to the lift truck and an upper extremity 22 of mast 20 is configured for moving along a horizontal track in a warehouse aisle. Carriage 18 moves vertically along mast 20, and part of the carriage may freely roll within the movable section 16 of the main lift truck mast 12. Separate rollers engage the mast 20 and movable section 16.

If carriage 18 becomes stuck in an elevated position, and if pressure is released in the cylinder causing mast section 16 to move downward, a dangerous condition may exist in which carriage 18 is supported only by an obstacle. When the obstacle is removed, carriage 18 may fall until it catches up with mast portion 16, and its driving piston and the carriage supporting chain.

To prevent the chain, piston and mast 16 from descending at an atypically high rate with respect to carriage 18, and to prevent mast 16 and its piston and the carriage supporting chain from descending while carriage 18 remains stopped, safety apparatus generally referred to by the numeral 30 is employed. The safety apparatus comprises a chain 32 having a first end 34 fixed to an upper portion of mast 20. The flexible chain 32 is passed under the first rotating means 36 which may be an idler sprocket and which may be generally referred to as a pulley means. Chain 32 then passes over the second rotating means, pulley or idler sprocket 38 which is mounted at upper extremity 22 of mast 20. Chain 32 extends downward under third rotating means 40, which is preferably an idler sprocket and which may be considered as an idler pulley. The chain then extends upward, and its distal end 42 is connected to carriage 18.

As carriage 18 is forced upward by movement of the piston and the carriage lifting chain, distal end 42 of chain 32 is pulled upward. Since carriage 18 moves upward at twice the rate of mast portion 16 and idler 36, the chain is fully taken up by carriage 18. Thus, slack need not exist in chain 32.

For mast section 16 and its associated piston and chain idler to be lowered, carriage 18 must move downward which allows the chain to pay around idlers 40, 38 and 36, permitting idler 36 to move downward at half the rate of carriage 18.

Figures 2, 3:
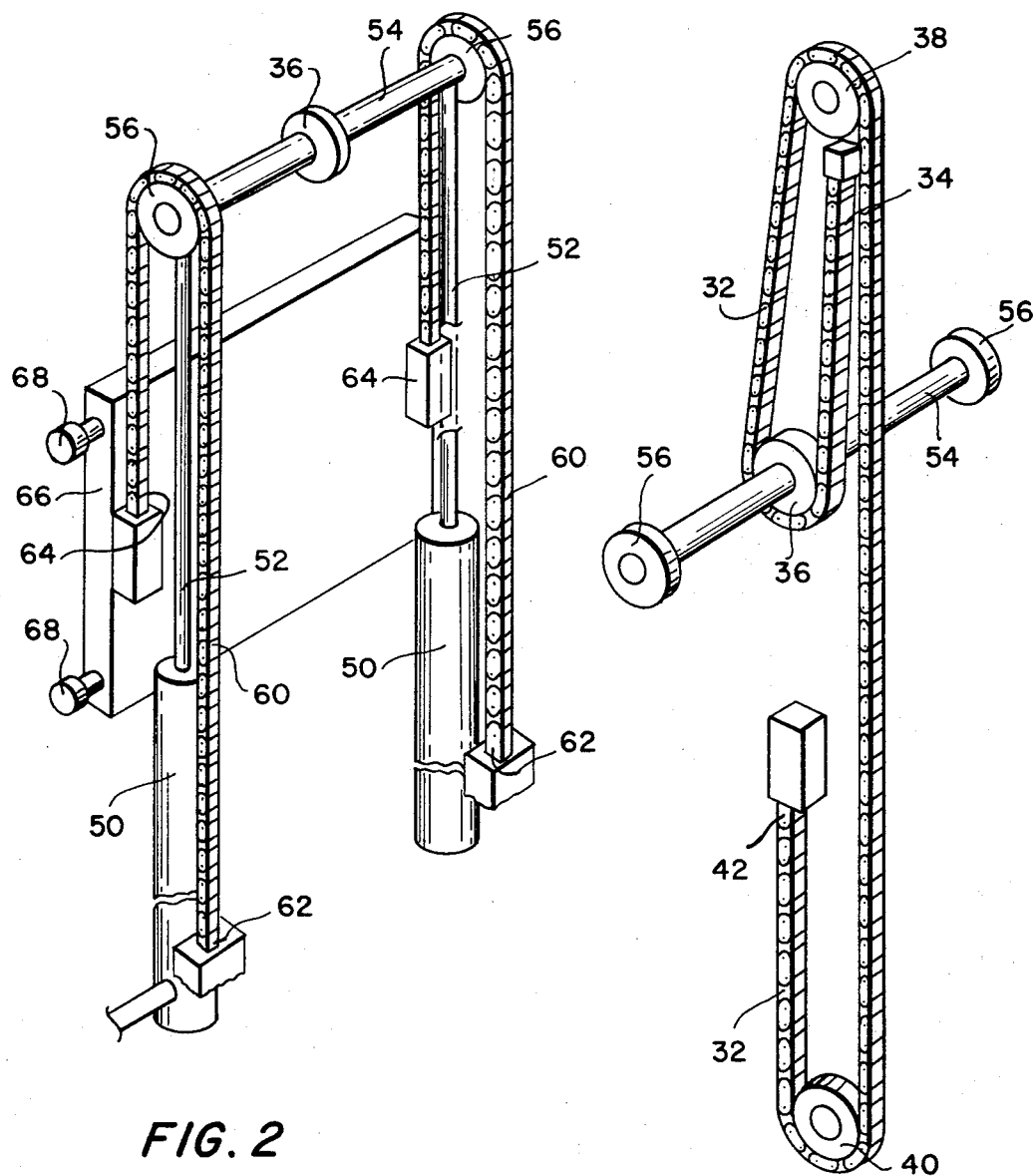
FIG. 2 is a perspective schematic detail of a carriage lifting apparatus of a conventional lift truck.
FIG. 3 is a perspective schematic detail of the carriage safety system of the present invention.

As shown in detail in FIG. 2, parallel cylinders 50 drive pistons 52. Distal ends of pistons 52 are fixed to shaft 54. Freely turning sprockets 56 are mounted on opposite ends of shaft 54. An inner portion of a telescoping mast may also be attached to shaft 54 so that the mast moves with the shaft. Chains 60 are fixed at ends 62 to some convenient point on the lift truck, such as the cylinders 50. The chains pass over the first rotating idler sprockets 56, and ends 64 of the chain are connected to carriage 66. Elements 68 are rollers for moving along a mast.

As may be clearly seen from the drawings, when carriage 66 remains in an elevated position after pressure is relieved from cylinders 50, pistons 52, shaft 54, sprockets 56 and chain 60 fall, carriage 66 is left in a precarious position in which it is ready for free fall.

To prevent carriage free fall, the apparatus shown in FIG. 3 is employed. As also shown in FIG. 1, end 42 of chain 32 is connected to the carriage. The opposite end 34 of chain 32 is fixed at a point above the carriage. Chain 32 extends below idler sprocket 36 which is mounted on shaft 54 as shown in FIG. 2. The chain then extends over the second idler sprocket 38 and under the third idler sprocket 40. In the latter condition, shaft 54 and hence, idler sprockets 56 and the carriage supporting chain and the shaft attached pistons may not move downward until downward movement of the carriage permits chain end 42 to move downward, thus, moving chain 32 and permitting idler 36 on shaft 54 to move downward. Because the idler sprocket 36 and idler sprockets 56 are mounted on the identical shaft 54, the idler sprockets 36 and 56 on shaft 54 are generally referred to herein as the first rotating means or movable pulley means.

While the invention has been particularly described for use with lift truck apparatus, the invention which is embodied in FIG. 3 may be useful in any form of carriage which is configured for up and down movement.

While the invention has been particularly shown and described with reference to a preferred embodiment thereof, it will be understood by those skilled in the art that various changes in form and details may be made therein without departing from the spirit and scope of the invention.

What is claimed is:

1. Carriage safety apparatus comprising mast means for supporting loads, carriage means mounted on the mast means for up and down movement thereon, extensible means mounted adjacent the mast means for moving the carriage means upward on the mast means, first rotating means mounted on the extensible support means for movement therewith, second and third rotating means mounted on the mast means respectively near upper and lower extremities thereof, a first flexible means fixed with respect to the mast means near a lower portion thereof, extending over the first rotating means and connected to the carriage means for lifting the carriage means with upward movement of the extensible means and first rotating means, and second flexible means attached to the carriage means, the second flexible means passing sequentially under the third rotating means, over the second rotating means, and under the first rotating means, and being fixed to the mast means at an upper portion thereof for preventing downward movement of the first rotating means and extensible means in the absence of downward movement of the carriage means.

2. The apparatus of claim 1 further comprising a vehicle, and wherein the mast means comprises a first rigid mast mounted on the vehicle, wherein the extensible means comprises a second extensible mast mounted on the vehicle and wherein the carriage means comprises a materials handling carriage mounted on the first mast for vertical movement therealong.

* * * * *